United States Patent [19]

Walcott et al.

[11] Patent Number: 5,034,040
[45] Date of Patent: Jul. 23, 1991

[54] STORAGE TANK DEHYDRATION SYSTEM

[75] Inventors: William R. Walcott, Grandville; Clarence C. Lubberts, Hopkins, both of Mich.; Robert E. Terpstra, Panama City Beach, Fla.

[73] Assignee: Air-Kare, Inc., Wyoming, Mich.

[21] Appl. No.: 543,045

[22] Filed: Jun. 22, 1990

[51] Int. Cl.$^5$ .............................................. B01D 53/04
[52] U.S. Cl. ....................................... 55/357; 55/387; 55/388; 55/507
[58] Field of Search ............... 55/281, 357, 374, 377, 55/378, 387–389, 505–507; 285/312; 403/314, 374, DIG. 4

[56] References Cited

U.S. PATENT DOCUMENTS

| 1,013,767 | 1/1912 | Hadley | 55/388 X |
|---|---|---|---|
| 1,759,971 | 5/1930 | Austin | 55/388 X |
| 1,841,691 | 1/1932 | Wilson | 55/387 X |
| 1,958,735 | 5/1934 | Worthington | 55/280 |
| 2,359,959 | 10/1944 | Anderson | 55/387 X |
| 2,404,468 | 7/1946 | Vokes et al. | 55/387 |
| 2,465,163 | 3/1949 | Lockwood | 89/31 X |
| 2,478,586 | 8/1949 | Krapp | 285/312 |
| 2,511,726 | 6/1950 | Lockwood | 55/387 |
| 2,518,026 | 8/1950 | Krapp | 285/312 |
| 2,659,128 | 11/1953 | Baldwin, Jr. et al. | 55/387 X |
| 2,728,407 | 12/1955 | Squier | 55/387 X |
| 2,845,138 | 7/1958 | Gageby | 55/387 X |
| 2,860,815 | 11/1958 | Finn et al. | 137/14 X |
| 3,195,934 | 7/1965 | Parrish | 403/374 X |
| 3,276,620 | 10/1966 | Dorfman | 285/312 X |
| 3,633,948 | 1/1972 | Dickey | 285/312 |
| 3,976,313 | 8/1976 | Lauffenburger et al. | 285/312 X |
| 4,059,296 | 11/1977 | Panourgias | 285/312 |
| 4,519,635 | 5/1985 | McMath | 285/312 X |
| 4,594,082 | 6/1986 | Catherwood, Sr. | 55/388 X |
| 4,618,171 | 10/1986 | Fahl | 285/312 X |
| 4,651,901 | 3/1987 | Ozdemir | 285/312 X |
| 4,689,057 | 8/1987 | Gasper | 55/387 X |
| 4,691,942 | 9/1987 | Ford | 285/312 X |
| 4,802,694 | 2/1989 | Vargo | 285/312 X |

Primary Examiner—Robert Spitzer
Attorney, Agent, or Firm—Price, Heneveld, Cooper, DeWitt & Litton

[57] ABSTRACT

The specification discloses a storage tank dehydration apparatus for connection to the air inlet pipe of the tank, having a polymeric quick connect coupling with a through passage and threads at the upper portion thereof, threadably attached to the air inlet pipe. The lower portion of the coupling has an axial female cavity with pivotal cam lock levers at the exterior of the coupling, and cam surfaces extendable into the female cavity to engage a peripheral groove on the neck at the upper end of a molded polymeric bottle. The bottle has an internal chamber for desiccant, the chamber being defined by a smooth, polymeric wall. Near the bottom of the bottle are air inlet ports and a lower liquid drain outlet.

12 Claims, 2 Drawing Sheets

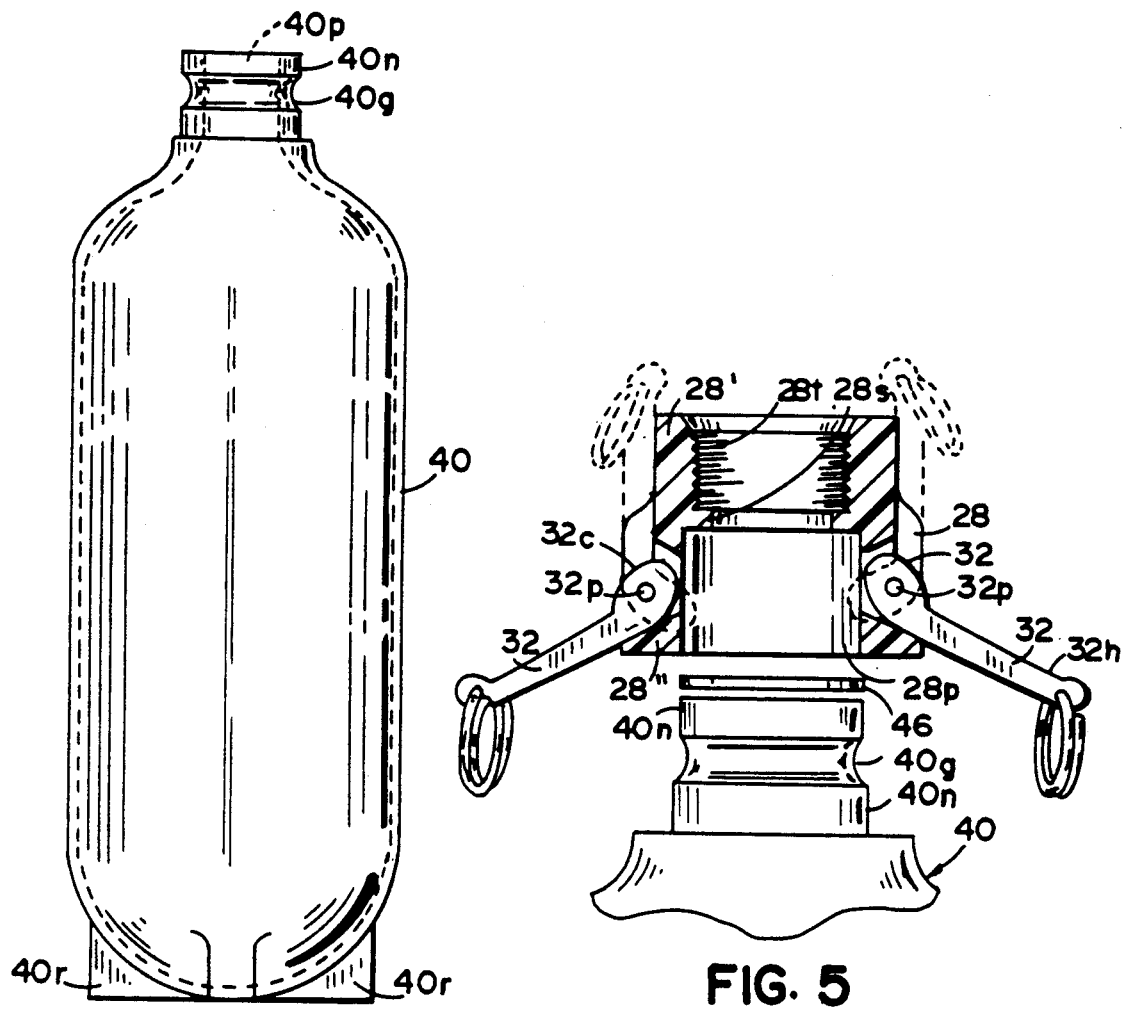
FIG. 3
FIG. 5
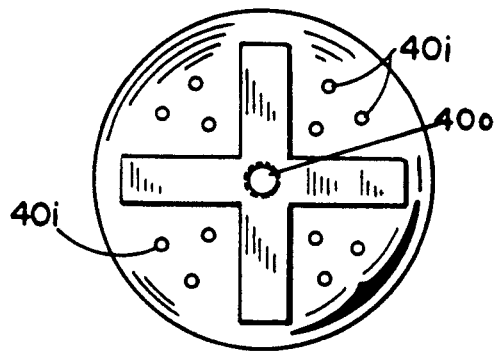
FIG. 4

STORAGE TANK DEHYDRATION SYSTEM

BACKGROUND OF THE INVENTION

This invention relates to a storage tank dehydration system, and particularly a quick connect and disconnect, noncorrosive, hygroscopic-agent container dehydration apparatus.

Large storage tanks for petroleum, chemicals and other liquids are typically located with exposure to the environment. Consequently, when portions of the liquid are drained from the tank, air is allowed to enter the tank to replace the liquid and thereby prevent a disruptive internal negative pressure. Because the air is from the surrounding environment, it contains moisture in varying amounts depending upon the temperature and humidity conditions at the time. Consequently, undesired moisture is entrained into the tank to react with the chemicals, dilute the remaining liquid, contaminate the contents and/or corrode the storage tank. At present, the accepted technique for limiting this adverse moisture entrance is to threadably mount or weldably attach to the air inlet pipe a metal container filled with a hygroscopic agent such as calcium chloride. Such vessels rapidly corrode, making such partially or totally useless in a short time. The corroded walls of the container can cause the hygroscopic material to undesirably fuse and bridge therein and sometimes even plug the apparatus against air flow. Moreover, since the corroded vessel and connections are very difficult to remove and refill, they are too often purposely neglected, to the detriment of the user of the storage tank contents.

SUMMARY OF THE INVENTION

The present invention provides an effective corrosion-free hygroscopic containment vessel with noncorrodible, quick connect and disconnect coupling mechanism, allowing persons required to monitor the storage tank to quickly and conveniently disconnect, remove and replace the container in seconds, or refill the container at the site, if desired. This service can be performed by persons without special skills, e.g., employees of a service organization. The time involved for the conversion is brief, usually only seconds, and the effort is minimal. No tools are required. Moreover, the units have smooth, noncorrodible inner walls to inhibit bridging.

The container is a molded polymeric bottle having bottom air inlet ports and a bottom liquid drain outlet, smooth polymeric inner walls, an upper neck with a peripheral exterior groove for receiving cams of pivotal cam lever locks on a coupling attached to the vent pipe. The coupling has inner threads at its upper portion to attach to the vent pipe, and a female cavity on its lower portion to receive the neck of the bottle. The cam lever locks are pivotally mounted on the coupling to move into the female cavity and in engagement with the peripheral groove on the bottle neck.

These and other features, objects and advantages of this invention will become apparent to those in the art upon studying the following specification in conjunction with the drawings.

BRIEF DESCRIPTION OF THE DRAWINGS

FIG. 3 is a side elevational view of the novel container for hygroscopic materials in the system;

FIG. 4 is a bottom view of the container in FIG. 3;

FIG. 5 is an exploded, cross sectional, side elevational view of the coupling and the top of the container.

DESCRIPTION OF THE PREFERRED EMBODIMENT

Figure 1:
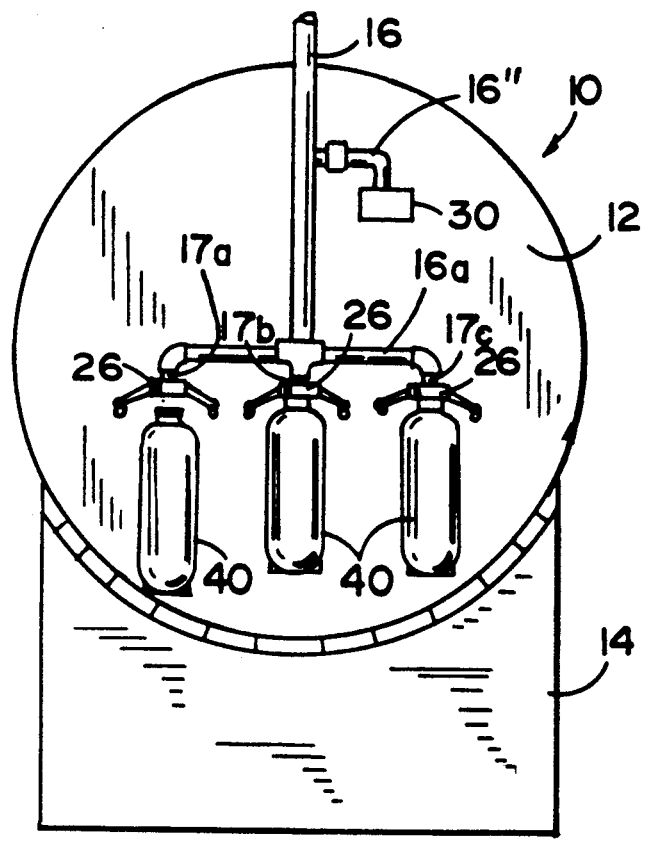
FIG. 1 is an elevational view of a storage tank employing this invention.
Figure 2:
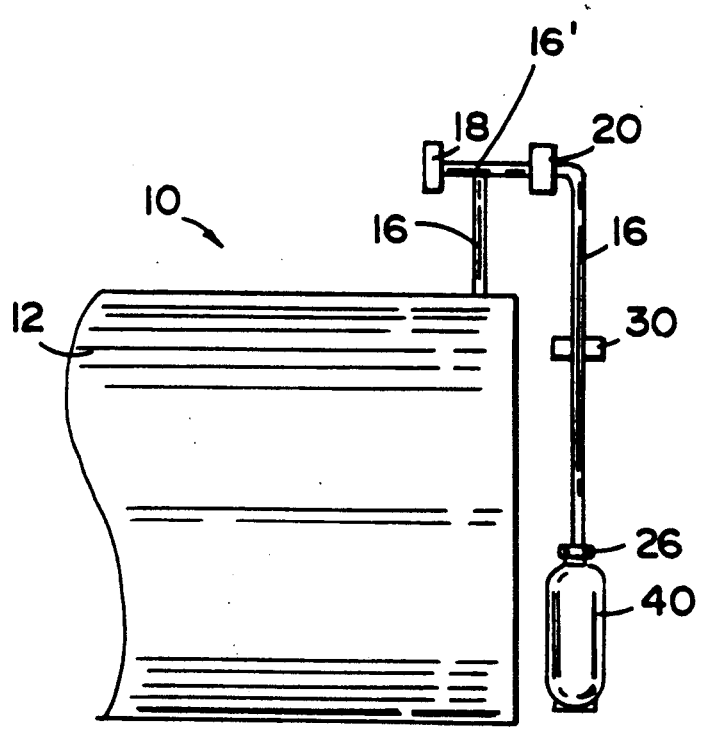
FIG. 2 is a side elevational view of the operative components in FIG. 1.

Referring now specifically to the drawings, the storage apparatus 10 there depicted includes a storage tank 12 shown to be of cylindrical configuration and arranged horizontally on its axis. It is supported on a conventional tank saddle 14 typically comprising a series of spaced supports having concave upper portions to receive the tank. Extending from the top of tank 12 is a vent pipe 16 which typically extends over the end of the tank and down along side the end of the tank as illustrated. On a spur line 16' of the vent pipe is a typical pressure relief valve 18 to the atmosphere to alleviate positive pressure buildup in the tank. Vent pipe 16 also preferably includes a conventional one way check valve 20 allowing air flow only in the direction from the atmosphere to the tank. At the inlet end of vent pipe 16 are one or more (here three) quick connect and disconnect couplings 26 and containers 40, both to be described in detail hereinafter. Between the inlet end of the vent pipe and check valve 20, on a separate spur line 16", is a safety seal 30 of conventional type, typically filled with oil, to prevent a negative air pressure in the tank in the event of plugging of air flow through containers 40. This allows air flow into the tank through safety seal 30 when a predetermined negative pressure differential has been reached.

For illustration purposes, three containers 40 in FIG. 1 are shown with three couplings 28, it being realized that any number, one or more, of such units can be employed on a particular installation. One container is shown detached. Thus, vent pipe 16 in FIG. 1 is shown to include three threaded nipples 17a, 17b and 17c from the manifold 16a for connection of three couplings 28 thereto.

Each coupling 28 (FIG. 5) comprises a generally tubular component having an upper portion 28' and a lower portion 28", defining a through passage 28p therethrough Upper portion 28' has interior threads 28t for threadably connecting the coupling to the exterior threads of vent pipe 16 or a nipple extension thereof. Threads 28t extend from the upper end of passage 28p to an annular stop 28s projecting radially inwardly into the passage and forming the upper end of the lower passage portion which forms an axial female receptor for the male upper neck end 40n of container 40. The inner diameter of passage 28p in the lower portion of coupling 28 is slightly larger than the external diameter of neck 40n of container 40. Each coupling 28 also includes at least two cam lever locks 32 opposing each other for engaging the coupling to the container 40. In the particular illustrated embodiment, two such cam lever locks are shown directly opposite each other, in mirror image Each includes a handle portion 32h extendable out from coupling 28, a pivot connection 32p to coupling 28 in slots provided in the coupling, and internal cam noses 32c extendable into the female cavity of the lower portion of coupling 28. When the levers are raised to a position adjacent the outer side walls of coupling 28, these cams 32c will project into the female cavity of the coupling. When the levers are pivoted downwardly out away from the coupling, the cams are retracted out of the female cavity to be recessed into the body of coupling 28. This coupling 28 is of molded polymeric material The cam lever locks are preferably of stainless steel. This type of coupling has been employed for other applications previously and is not per se new with the inventors.

Each container 40 preferably comprises an upright, cylindrical, molded, polymeric bottle-like container, hollow on the interior, having smooth polymeric interior walls. The exterior lower portion of the container includes ribs 40r having the lower surfaces thereof in a common plane to enable the container to be self supporting on a flat surface. The neck 40n of the container includes a passage 40p to serve as an entry to enable the desiccant container to be filled with the hygroscopic material such as calcium chloride, and to also serve as an exit to enable air to exit the container as described hereinafter The exterior of neck 40n includes a peripheral concave groove 40g to receive cams 32c of cam lever locks 32 for quick coupling thereof. The annular upper end of neck 40n comprises a sealing surface to abut against an annular resilient sealing gasket 46 of rubber or the equivalent (FIG. 5). The gasket upper surface engages the lower surface of shoulder 28s. The bottom of the container includes air inlet ports and a liquid drain. More specifically, a plurality of air inlet ports 40i, here shown to be three in each quadrant, extend through the bottom of the container which is preferably concave on the inside and convex on the outside. In the center of the bottom is an outlet 40o for liquid. This outlet is lower than the air inlets and may be threaded to connect some sort of drain tube thereto.

With container 40 filled with hygroscopic agent, it is quickly and tightly connected on the apparatus by extending its nose 40n into the lower portion of coupling 28 and shifting the cam levers upwardly to cause cams 32c to pivot into groove 40g against the upper portion of the groove wall. The cams bias the container upwardly to squeeze gasket 46 into tight engagement between the container and the coupling. The polymeric container groove wall deforms slightly under the metal cams to create a holding force that prevents the cam levers from accidentally dropping. The unit is thus suspended, with replacement air to the tank being allowed to enter through ports 40i, pass through the hygroscopic agent in the container, out the neck of the container, through the coupling, and thus through the vent pipe 16 into tank 12. As moisture collects in the containers, it is allowed to drain out through the opening 40o. As hygroscopic agent is used up, the remaining agent is allowed to slide down the interior smooth walls of the container toward the bottom.

The novel apparatus enables frequent, simple change of hygroscopic agent containers on storage tanks by unskilled labor Specifically, quick disconnect of the used containers because of the hygroscopic agent being used up, or the like, is achieved simply by pivoting the two cam levers down to the release condition, enabling the container to drop down and be either refilled at the site or replaced by another like container. The container is connected by inserting its neck 40n into the lower portion of coupling 28 and pivoting the two cam lock levers back up to the original lock position. The entire operation of replacement requires only seconds. Refilling of a container requires slightly more time.

Conceivably, certain details of the structure may be modified to suit a particular installation or material. The invention is not intended, therefore, to be limited to the particular illustrative and preferred embodiment set forth, but only by the scope of the appended claims and the reasonably equivalent structures to those defined therein.

The embodiments of the invention in which an exclusive property or privilege is claimed are defined as follows.

1. A storage tank dehydration apparatus for connection to an air inlet pipe of a storage tank, comprising:
   a polymeric quick connect coupling having a tubular body defining a through passage having an upper portion and a lower portion, said upper portion having means for fixed connection to the inlet pipe of a storage tank, said lower portion having first male or female quick connect and disconnect means for quick connection to and disconnection from a desiccant container;
   a polymeric desiccant container for connection to and suspension from said first quick connect and disconnect means, said container defining an internal chamber for retaining desiccant therein;
   said container having an upper neck, said neck having second female or male quick connect and disconnect means cooperable with said first means to connect and suspend said container or to disconnect said container;
   said container having air inlet ports at the bottom thereof to admit air to said tank through said container and desiccant therein, and flow through said coupling to the air inlet pipe to the tank; and
   said polymeric container having a bottom liquid drain orifice to drain liquid therefrom.

2. The storage tank dehydration apparatus in claim 1 wherein said polymeric container has said liquid drain orifice below the level of at least some of said air inlet ports.

3. The storage tank dehydration apparatus in claim 1 wherein said first quick connect and disconnect means is female and said coupling has at least two cam lever locks pivotally connected to said coupling and engageable with a groove of said container neck to hold the container.

4. The storage tank dehydration apparatus in claim 3 wherein said cam lever locks pivot upwardly to connect said container to said coupling;
   said cam lever locks each include a cam; and
   said container is biased upwardly by said cams during such connection.

5. The storage tank dehydration apparatus in claim 4 including an annular sealing gasket between said container and said coupling;
   said sealing gasket being squeezed by said upward bias.

6. The storage tank dehydration apparatus in claim 5 wherein the wall of said groove is slightly deformed by said cam during connection.

7. The storage tank dehydration apparatus in claim 3 wherein said container has smooth polymeric inner walls to allow desiccant material therein to slide down said walls.

8. The storage tank dehydration apparatus in claim 1 including an air inlet pipe to a tank, and a safety valve on said air inlet pipe above said container to enable air entry in the event of said container becoming plugged.

9. A storage tank dehydration apparatus for connection to a threaded air inlet pipe of a storage tank, comprising:

a polymeric quick connect coupling having a tubular body defining a through passage having an upper portion and a lower portion, said upper portion having internal threads for fixed connection to the threaded inlet pipe of a storage tank, said lower portion having female quick connect and disconnect means for quick connection to and disconnection from a desiccant container;

a polymeric desiccant container for connection to and suspension from said first quick connect and disconnect means, said container defining an internal chamber for retaining desiccant therein;

said container having an upper neck, said neck having male quick connect and disconnect means cooperable with said female quick connect and disconnect means to connect and suspend said container or to disconnect said container;

said container having air inlet ports at the bottom thereof to admit air to said tank through said container and desiccant therein, and flow through said coupling to the air inlet pipe to the tank;

said polymeric container having a bottom liquid drain orifice to drain liquid therefrom; and said coupling having at least two cam lock levers pivotally connected to said coupling and engageable with a recess of said container neck to interengage said coupling and said container and suspend said container beneath said coupling.

10. The storage tank dehydration apparatus in claim 9 wherein said cam lever locks pivot upwardly to connect said container to said coupling;

said cam lever locks each include a cam; and said container is biased upwardly by said cams during such connection.

11. The storage tank dehydration apparatus in claim 10 including an annular sealing gasket between said container and said coupling;

said sealing gasket being squeezed by said upward bias.

12. The storage tank dehydration apparatus in claim 11 wherein the wall of said recess is slightly deformed by said cam during connection.

* * * * *

UNITED STATES PATENT AND TRADEMARK OFFICE
CERTIFICATE OF CORRECTION

PATENT NO. : 5,034,040

DATED : July 23, 1991

INVENTOR(S) : Walcott et al.

It is certified that error appears in the above-identified patent and that said Letters Patent is hereby corrected as shown below:

```
Column 2, Line 47:
After "therethrough" insert --.--.

Column 2, Line 61:
After "image" insert --.--.

Column 3, Line 5:
After "material" insert --.--.

Column 3, Line 20:
After "hereinafter" insert --.--.

Column 3, Line 58:
After "labor" insert --.--.

Column 4, Line 66:
"to a tank" should be --to the storage tank--.
```

Signed and Sealed this

Sixteenth Day of February, 1993

*Attest:*

STEPHEN G. KUNIN

*Attesting Officer*  Acting Commissioner of Patents and Trademarks